Patented July 5, 1949

2,475,530

UNITED STATES PATENT OFFICE 2,475,530

PROCESS FOR MAKING AMINOANTHRAQUINONE SULFONIC ACIDS

William Wyndham Tatum, Trevone, near Padstow, England, assignor to Imperial Chemical Industries Limited, a corporation of Great Britain No Drawing. Application March 14, 1947, Serial No. 734,860. In Great Britain March 18, 1946

4 Claims. (Cl. 260—371)

This invention relates to anthraquinone dyestuffs and more particularly it relates to a new process for the manufacture of anthraquinone dyestuffs for wool and other animal fibres.

In British Specification No. 491,493 there is described a process for the manufacture of anthraquinone derivatives which comprises interacting a leuco derivative of an anthraquinone compound which carries as substituent in the 1-position a hydroxyl or amino group, in the 4-position, a hydroxyl, amino-alkylamino-, cycloalkylamino, or arylamino group and which may carry in the 5-, 6-, 6- or 8-positions, 1 or 2 hydroxyl groups, with an amine or amines of either the formula aralkyl—CH(NH$_2$)—aralkyl or the formula aralkyl—CH(NH$_2$)—alkyl, oxidising the resulting leuco derivative, and then sulphonating.

In British Specification No. 497,016 a process is described for making 1:4- and 1:5-bis-($\alpha$:$\beta$-diphenylethylamino)-anthraquinone sulphonic acids by reacting $\alpha$:$\beta$-diphenylethylamine with anthraquinone derivatives containing replaceable substituents in the 1- and 4- or 1- and 5-positions and which may contain other substituents, followed by sulphonation.

In the British Specification No. 564,859 a process is described for the manufacture of acid wool dyestuffs of the anthraquinone series which comprises reacting a C-aralkylcycloaliphatic amine of the formula NH$_2$X(CH$_2$)$_n$Y in which X stands for a cycloaliphatic residue which may carry alkyl groups as substituents, Y stands for an aryl radical, substituted or not and $n$ stands for a whole number from 1 to 3, with an anthraquinone derivative which may be wholly or partly in the leuco form, which contains in the $\alpha$-position at least one substituent replaceable by an imino radical by reacting with a primary amine, and which contains in the remaining positions any substituent other than —SO$_3$H groups and subsequently introducing one or more —SO$_3$H groups into the molecule of the reaction product by treating it with sulphonating agents.

I have now found that the sulphonated anthraquinone derivatives described in the hereinbefore mentioned specifications can be conveniently made by condensing a suitable sulphonated amine with a suitable anthraquinone derivative and I have further found that certain sulphonated anthraquinone derivatives which cannot be prepared by the processes of the hereinbefore mentioned specifications or can be prepared only with difficulty by these processes, are readily made by the process of my invention.

According to my invention therefore I provide a process for the manufacture of anthraquinone dyestuffs which comprises reacting an amine of the formula NH$_2$—CHR$_1$R$_2$ where R$_1$ is an aryl or aralkyl group which carries a sulphonic acid group as substituent in the aryl nucleus and which may carry further substituents other than sulphonic acid groups in the aryl nucleus, R$_2$ is a hydrocarbon radical which may carry substituents other than sulphonic acid groups and which may together with R$_1$ form part of a cycloaliphatic ring, with an anthraquinone compound which is wholly or partly in the leuco form, which is substituted in the 1- and 4-positions by hydroxyl, amino or alkylamino groups and which may be further substituted by hydroxyl groups in one or both of the 5- and 8-positions or by halogen atoms in one or both of the 6- and 7-positions and oxidising the resulting leuco derivative.

The sulphonated amines may be used in the form of their salts. As suitable salts of sulphonated amines for use in this reaction there may be mentioned for example sodium $\alpha$:$\beta$-diphenylethylaminemonosulphonate, sodium 2-benzylcyclohexylaminemonosulphonate, sodium $\alpha$-phenyl-$\gamma$-aminobutanemonosulphonate; and potassium 4-chloro-$\alpha$:$\alpha$-diphenylmethylaminemonosulphonate.

As suitable anthraquinone compounds for use in the reaction there may be mentioned for example quinizarin, 1:4:5-trihydroxyanthraquinone, 1:4:5:8-tetrahydroxyanthraquinone, and 1:4-diaminoanthraquinone.

The reaction may be carried out for example by stirring the reagents together in aqueous medium in the presence of alkali. A reducing agent such as sodium hydrosulphite may be added to the reaction mixture and this is especially advantageous when the anthraquinone compound used in the reaction is not wholly in the leuco form.

The resulting leuco derivative may be oxidised to the dyestuff for example by stirring the reaction mixture with sodium m-nitrobenzene sulphonate or by blowing air or oxygen into the reaction mixture.

The dyestuffs made according to the process of this invention dye wool and other animal fibres in blue to violet shades of excellent fastness properties.

The invention is illustrated but not limited by the following examples in which the parts are by weight.

Example 1

11 parts of sodium α:β-diphenylethylaminemonosulphonate, 15 parts of water, 3 parts of leucoquinizarin and 0.6 part of caustic soda are stirred together at 95° C. for 20 hours. When the condensation is complete air is passed into the solution to oxidise any leuco-compound present. The blue dyestuff so obtained is filtered off and washed with cold water. It consists of the disodium salt of 1:4-di-(α:β-diphenylethylamino)-anthraquinone disulphonic acid and is probably identical with the product described in Example 1 of the British Specification No. 497,016.

The sodium α:β-diphenylethylamine sulphonate used in the above example may be prepared in the following way. 5 parts of α:β-diphenylethylamine are dissolved in 20 parts of 100% sulphuric acid and 23% oleum is added until a sample of the product dissolves completely in dilute sodium carbonate solution. Approximately 15 parts of oleum are required. The reaction mixture is poured into a mixture of ice and water. The sulphonic acid which is precipitated is filtered off, washed with water and neutralised with caustic soda solution. The neutral solution so obtained is evaporated to dryness.

Example 2

10 parts of sodium 2-benzylcyclohexylamine monosulphonate, 16 parts of 4% aqueous caustic soda solution and 0.5 part of sodium hydrosulphite are mixed with 3 parts of commercial quality leuco-1:4:5:8-tetrahydroxyanthraquinone which contains approximately 20% of 1:4:5:8-tetrahydroxyanthraquinone. The mixture is stirred at about 95° C. for 12 hours. The violet coloured reaction mixture so-obtained is diluted with water and 1 part of sodium m-nitrobenzene sulphonate and 4 parts of caustic soda are then added. Common salt is added to the solution and the precipitated dyestuff is then filtered off and dried. The dyestuff dyes wool, from an ammonium acetate bath, in fast bluish green shades.

The sodium 2-benzylcyclohexylamine monosulphonate used in Example 2 may be prepared in the following way. 6 parts of 23% oleum are added to a solution of 4 parts of 2-benzylcyclohexylamine in 8 parts of 100% sulphuric acid. The reaction mixture is poured into a mixture of ice and water and the sulphonic acid which is precipitated is filtered off and neutralised with dilute caustic soda solution. The neutral solution so obtained is evaporated to dryness.

Example 3

15 parts of sodium 2-benzylcyclohexylamine monosulphonate, 20 parts of 3% aqueous caustic soda solution and 4 parts of leuco quinizarin are stirred together for 20 hours at 95° C. The leuco compound so obtained is then filtered off and washed with water. The leuco compound is well-stirred with dilute caustic soda solution and 1.5 parts of sodium m-nitrobenzenesulphonate until the colour of the suspension has changed from green to blue. Salt is then added and the dyestuff is filtered off and washed with a 1% aqueous solution of common salt. The dyestuff which dyes wool from an ammonium acetate bath in bright blue shades is probably identical with the product of Example 1 of British Specification No. 564,859.

By using leuco-1:4:5-trihydroxyanthraquinone in place of leuco-quinizarin, there is obtained a bright greenish-blue dyestuff which is probably identical with that described in Example 8 of British Specification No. 564,859.

Example 4

9 parts of sodium α-phenyl-γ-aminobutanemonosulphonate, 12 parts of water, 2.5 parts of leuco-quinizarin and 0.5 part of caustic soda, are heated together for 16 hours at 120° C. in an autoclave. The green leuco-compound so obtained is stirred with water containing 2.5 parts of caustic soda and 1 part of sodium m-nitrobenzenesulphonate is added. The dyestuff is precipitated by addition of common salt, filtered off and washed with a 10% aqueous solution of common salt. It dyes wool in bright blue shades from an acetic acid bath. The sodium α-phenyl-γ-aminobutane monosulphonate used above may be obtained in the following way. α-phenyl-γ-aminobutane is sulphonated with 100% sulphuric acid or weak oleum. The reaction mixture is poured into water and sufficient lime is added to neutralise the excess sulphuric acid. The mixture is filtered and washed. Sufficient sodium carbonate is added to the filtrate and washings to form the sodium salt of the sulphonic acid. The mixture is filtered and the filtrate evaporated.

Example 5

10 parts of potassium 4-chloro-α:α-diphenylmethylamine monosulphonate, 10 parts of aqueous 5% caustic potash solution and 2 parts of leuco-quinizarin are heated together in a closed vessel for 3 hours at 100° C. The reaction mixture is diluted with water and then oxidised either by passing in air or by the addition of sodium m-nitrobenzenesulphonate and caustic potash. The precipitated dyestuff is filtered off and washed with 1% potassium chloride solution. The new dyestuff so obtained is the potassium salt of 1:4-di-(4-chloro-α:α-diphenylmethylamino)-anthraquinone disulphonic acid. It dyes wool from an ammonium acetate bath in very fast violet-blue shades.

The potassium 4-chloro-α:α-diphenylmethylaminemonosulphonate used in the above example may be obtained as follows. 4-chlorobenzophenone is heated with formamide at 200° C., the formyl derivative so obtained is hydrolysed to give 4-chloro-α:α-diphenylmethylamine (B. P. 192° C. at 15 m.m.). 25 parts of this compound are dissolved in 80 parts of 10% oleum and 23% oleum is then added, until a test sample dissolves completely in dilute sodium carbonate solution. Approximately 20 parts of 23% oleum are required. The solution is then poured into a mixture of ice and water and the suspension so obtained is filtered. The residue is stirred with water, neutralised with caustic potash and the solution so obtained is evaporated to dryness, or precipitated by the addition of potasium chloride.

I claim:

1. Process for the manufacture of anthraquinone dyes which comprises reacting an amine sulphonic acid compound of the group consisting of alpha:beta-diphenylethylaminemonosulphonic acid, 2-benzyl-cyclo-hexylaminemonosulphonic acid, alpha-phenyl-gamma-aminobutanemonosulphonic acid, 4-chloro-alpha:alpha-diphenylmethylaminemonosulphonic acid, and their alkali metal salts, with an anthraquinone compound of the group consisting of quinizarin, 1:4:5-trihydroxyanthraquinone, 1:4:5:8-tetrahydroxyanthraquinone and 1:4-diaminoanthraquinone, which anthraquinone compound is at least partly in leuco form, the reaction being carried out in aqueous medium and in the presence of an alkali.

2. Process according to claim 1 wherein the amine is $\alpha:\beta$-diphenylethylaminemonosulphonic acid alkali metal salt and the anthraquinone compound is quinizarin.

3. Process according to claim 1 wherein the amine is 2-benzylcyclohexylaminemonosulphonic acid alkali metal salt and the anthraquinone compound is quinizarin.

4. The process according to claim 1 wherein the amine employed is potassium 4-chloro-alpha:alpha - diphenylmethylaminemonosulphonate.

WILLIAM WYNDHAM TATUM.

REFERENCES CITED

The following references are of record in the file of this patent:

UNITED STATES PATENTS

| Number | Name | Date |
|---|---|---|
| 2,199,176 | Heslop et al. | Apr. 30, 1940 |
| 2,235,208 | Ellis et al. | Mar. 18, 1941 |
| 2,337,566 | McNally et al. | Dec. 28, 1943 |
| 2,426,547 | Buckley et al. | Aug. 26, 1947 |

FOREIGN PATENTS

| Number | Country | Date |
|---|---|---|
| 203,043 | Switzerland | May 16, 1939 |